(12) United States Patent
Wilhelm

(10) Patent No.: US 8,932,043 B2
(45) Date of Patent: Jan. 13, 2015

(54) PLASTIC TRIM PELLETIZER AND BRICKER RECLAIM DEVICE

(76) Inventor: Michael Brandon Wilhelm, Laurens, SC (US)

( * ) Notice: Subject to any disclaimer, the term of this patent is extended or adjusted under 35 U.S.C. 154(b) by 263 days.

(21) Appl. No.: 13/442,745

(22) Filed: Apr. 9, 2012

(65) Prior Publication Data
US 2012/0258189 A1 Oct. 11, 2012

Related U.S. Application Data

(60) Provisional application No. 61/473,455, filed on Apr. 8, 2011.

(51) Int. Cl.
*B29B 7/60* (2006.01)

(52) U.S. Cl.
USPC ........ 425/184; 425/207; 425/302.1; 425/307; 425/308; 425/384; 425/398; 425/412; 425/508; 425/509; 425/521

(58) Field of Classification Search
CPC B29B 17/00; B29B 17/0026; B29B 17/0047; B29B 17/0404; B29B 9/00; B29B 9/08; B29B 11/00; B29B 11/12; B29B 13/10; B29B 2017/00; B29B 2017/0026; B29B 2017/0031; B29B 2017/0047; B29B 7/60; B29B 7/66; B29B 2017/04; B29B 7/26; B29B 7/263; B29B 7/266; B29B 7/58; B29B 7/582; B29B 7/801; B29C 43/00; B29C 43/006; B29C 43/02; B29C 43/32; B29C 43/36; B29C 43/361; B29C 43/40; B29C 43/52
USPC ......... 425/184, 193, 195, 201, 202, 207, 217, 425/222, 240, 296, 297, 305.1, 307, 308, 425/384, 398, 407, 412, 111, 123, 127, 505, 425/508, 509, 510, 516, 517, 521, 302.1
See application file for complete search history.

(56) References Cited

U.S. PATENT DOCUMENTS

| | | | |
|---|---|---|---|
| 3,797,702 A | | 3/1974 | Robertson |
| 3,827,213 A | * | 8/1974 | Matzinger ................... 53/530 |
| 4,000,232 A | | 12/1976 | Klaeysen |
| 4,185,057 A | * | 1/1980 | Rossiter et al. ............ 264/40.1 |
| 4,340,347 A | | 7/1982 | Robertson |
| 4,467,969 A | | 8/1984 | Godfrey |
| 4,493,806 A | | 1/1985 | Hatzikelis |
| 5,060,870 A | * | 10/1991 | Trezek et al. ................ 241/19 |
| 5,114,331 A | * | 5/1992 | Umehara et al. ............ 425/200 |
| 5,129,588 A | * | 7/1992 | Toshio et al. ................ 241/33 |

(Continued)

*Primary Examiner* — Seyed Masoud Malekzadeh
(74) *Attorney, Agent, or Firm* — Daniel Boudwin; Global Intellectual Property Agency LLC

(57) ABSTRACT

Disclosed is a plastic trim reclaim process that recycles otherwise wasted trim into for reuse or densified composite bricks for resale. The device combines four sections to process trim scrap from a typical plastic extrusion process. The four sections comprise an input and feed section, a grinding and pre-sizing section, a compaction and sizing section, and a repelletizing and recovery section. The final product takes one of two forms: a compacted plastic brick or pellet-sized beads that can be directly reused in a new extrusion process. The compaction and sizing section utilizes a heating chamber and ram to force ground trim through an extruder, which is then cut into sections to form brick. The repelletizing and recovery section utilizes an extrusion process that feeds into a cutting plate, whereafter the sized pellets are cooled to solidify their structure prior to being vacuum transported into a container for reuse.

7 Claims, 4 Drawing Sheets

(56) References Cited

U.S. PATENT DOCUMENTS

| | | | |
|---|---|---|---|
| 5,197,678 A * | 3/1993 | Trezek et al. | 241/21 |
| 5,251,828 A | 10/1993 | Jacobs | |
| 5,395,055 A * | 3/1995 | Shutov et al. | 241/16 |
| 5,397,065 A * | 3/1995 | Shutov et al. | 241/16 |
| 5,505,886 A * | 4/1996 | Baugh et al. | 264/102 |
| 5,587,120 A * | 12/1996 | Vieslet et al. | 264/118 |
| 5,945,134 A * | 8/1999 | Strait et al. | 425/222 |
| 6,056,901 A * | 5/2000 | Hamatani et al. | 264/37.28 |
| 6,132,655 A * | 10/2000 | Ray | 264/68 |
| 6,544,447 B1 * | 4/2003 | Faerber | 264/37.26 |
| 6,595,369 B2 * | 7/2003 | Paulson | 209/149 |
| 6,659,756 B2 * | 12/2003 | Strait et al. | 425/222 |
| 7,430,960 B2 * | 10/2008 | Kim | 100/316 |
| 2002/0119310 A1 * | 8/2002 | Strait et al. | 428/361 |
| 2007/0017390 A1 * | 1/2007 | Kim | 100/316 |
| 2008/0128933 A1 * | 6/2008 | Przybylinski et al. | 264/31 |
| 2010/0145005 A1 * | 6/2010 | Hitzler et al. | 528/502 |
| 2010/0155979 A1 * | 6/2010 | Hofmann et al. | 264/37.26 |
| 2013/0024252 A1 * | 1/2013 | Sicklick et al. | 705/14.4 |

* cited by examiner

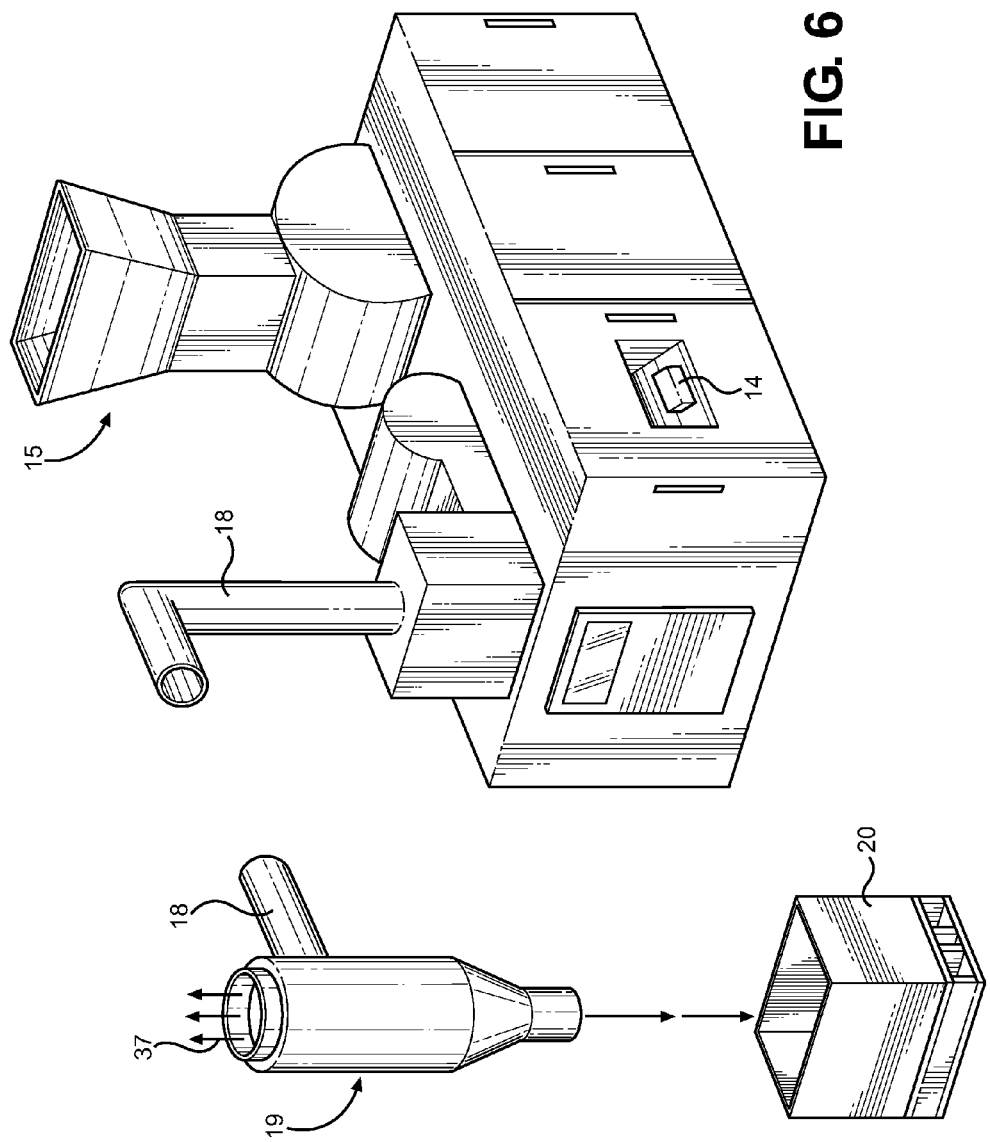

PLASTIC TRIM PELLETIZER AND BRICKER RECLAIM DEVICE

CROSS REFERENCE TO RELATED APPLICATION

This application claims the benefit of U.S. Provisional Application No. 61/473,455 filed on Apr. 8, 2011, entitled "Plastic Trim Inverter Reclaim."

BACKGROUND OF THE INVENTION

1. Field of the Invention

The present invention relates to industrial plastics manufacturing processes and a new means of recycling excess trim. More specifically, the present invention pertains to a plastic-blow film extrusion trim reclaiming process that takes inline trim and reprocesses it into a reusable form, reducing material loss, excessive process cost and waste byproducts.

In the manufacture of plastic sheets in blown film extrusion processes, plastic material is extruded in the form of a bubble or tube and displaced away from the extruder necessary to cool, cure and form the sheet material. The bubble of material can be mechanically cut or shaped to form several different treatments, including rolled material, formed into a container or laid out and trimmed into sheets. During the trimming process, material is removed to form a desired shape, which creates a desired end product and a quantity of trimmed sections that are not readily usable. Generally it is desired to recycle this trim material in a reclaim process; however this is a secondary process that can be cost prohibitive and difficult to achieve.

Typical reclaim processes utilize an extrusion process to recycle the scrap trim material; however present devices for this task are erratic and not reliable. The present invention is therefore disclosed in order to address a clear need in the art for an inline reclaim process that can easily and reliably recycle lost trim from a plastic manufacturing process, wherein the trim is processed into uniform virgin pellets for reuse or formed into elongated bricks.

2. Description of the Prior Art

Several devices exist in the prior art that relate generally to process scrap material and specifically to processing scrap plastics into a reusable or sellable form. These devices have familiar design elements for the purposes of accepting waste trim from a third-party extrusion or plastics manufacturing process and for sizing, heating, cooling and collecting the transformed trim into its desired form. Generally, these processes involve a phase change or thermal load, along with a mechanical cutting process to repelletize the trim into a virgin material, readying it for introduction into an extrusion process that will reuse the material rather than discarding it.

The present invention relates to a new plastic trim reclaim device and process that processes waste scrap and plastic trim from a plastic manufacturing process and outputs formed sections of solid material or pelletized beads that are ready for reintroduction into the original plastic manufacturing process. The formed sections are known as "bricks" of plastic material, which can be utilized in the construction of structure, sold as virgin material or used as a convenient method of transport large quantities of plastic material in a condensed form. The pelletized form of the outputted plastic is ready for use in an extrusion process or similar plastics manufacturing process requiring pellets as a starting material. The pellets are fed into the process and generally heated prior to be extruded or formed.

The present invention describes a combination process that brings together two processes for the purposes of reclaiming scrap trim and transforming it into one of two optional forms: densified and sized composite bricks or pelletized bead material. Specifically, the present invention discloses a bricker and repelitizer that processes trimmed plastic material from another process and allows an operator to choose a desired output form. This offers plastics manufacturers, and specifically co-extrusion processes that ability to reclaim otherwise wasted material, which can safe time, material and money for the manufacturer. The process can also be utilized by an independent operator that processes the trim scrap on behalf of the manufacturer, whereafter the processed material may be sold or reused. In plastic-blown film extrusion processes, it is known that the equipment cannot directly re-utilize ground trim material and feed that trim directly back to the process material input section. Simple grinders do not produce the correct pelletized form required to begin the extrusion process, therefore such trim is generally discarded or sold, creating a loss of material and a process byproduct. Common practice is to ship out scrap to be repelitized with different verities of plastics; consequently, when the repelitized material is blended back into extruders, problems such as gels, discoloration, carbon buildup, and esthetic errors occur in the extruded output. To ensure the quality of the starting pellets and to reduce overall waste, the present invention utilizes an inline trim reclaim process that can be utilized to solve these known issues in the art of plastic extrusion processes and scrap material recovery thereof.

Several devices exist in the prior art that relate to plastics manufacturing and trim reclaim processes. The devices deemed most relevant after a review of patented and public disclosures are herein described to highlight the differentiating features of the present reclaim process. Specifically, U.S. Pat. No. 3,797,702 and U.S. Pat. No. 4,340,347 to Robertson disclose a scrap recovery and feed system for a plastic manufacturing system for the production of sheet, film, formed and molded objects, which recycles trimmed scrap material utilizing an inducer blower and forced air to blow scrap trimmings into a grinder. After the grinder, a separator separates the scrap from the air stream, whereafter the ground scrap falls into a feed hopper. The feed hopper is continuously filled with base and processed trim material to an extruding means. The Robertson devices relates to a process utilizing an adjustable vacuum-pressure airstream in which scrap flows along an open conduit to a grinder and then to a supply hopper of the processing system. The device is specific to the use of a pressurized air stream to move reclaimed trim back to the hopper starting point of the extrusion process. The present invention provides a means to pelletize the material for direct reuse. While also utilizing a forced air conveyance means, the present invention provides improved output and that which can be modified between composite bricks to virgin pellets.

U.S. Pat. No. 4,000,323 to Klaeyson describes a method for cooling and pelletizing thermoplastic material that includes compacting the material through a plurality of orifices. Flow rate of a gaseous steam is utilized as a heating source, which is regulated by a control circuit to maintain the heat utilized to transform the plastic material into a molten or semi-molten state. The regulation of temperature is critical to prevent overheating of the process that can lead to plastic agglomeration that can bind the compaction means and damage components. The Klaeyson device is primarily concerned with temperature regulation and an improved pelletizer, rather than a combined pelletizer and bricker for reclaiming lost plastic trim.

Finally, U.S. Pat. No. 4,467,969 to Godfrey discloses an improved method and apparatus for reclaiming film from an extrusion line. The system reclaims oriented and un-oriented film produced from a film process. The Godfrey device provides a trim reclaim process, but fails to disclose the novel structural aspects of the present invention, which provides a means to create virgin pellets for direct reuse, or composite bricks for alternative uses.

The present invention is a new and novel process that brings together several components to process extrusion trim material using a bricking process or a repelletizing process. One of two output types may be chosen for the purposes of reclaiming otherwise lost plastic trim. The present invention is a robust and operator-independent process that facilitates ready processing of trim material in an in-line configuration so as to conserve material and cost. The overall process is a new combination that is substantially divergent in design elements from the prior art; consequently it is clear that there is a need in the art for an improvement to existing devices. In this regard the instant invention substantially fulfills these needs.

SUMMARY OF THE INVENTION

In view of the foregoing disadvantages inherent in the known types of plastic trim reclaim devices now present in the prior art, the present invention provides a new reclaim process that combines a bricking process and a repelletizer to be utilized for providing convenience for the user when reclaiming otherwise lost trim and scrap plastic material from a manufacturing process.

It is therefore an object of the present invention to provide a new and improved plastic trim reclaim device that has all of the advantages of the prior art and none of the disadvantages.

It is another object of the present invention to provide a plastic trim reclaim process that allows two distinct output forms: a composite brick or pelletized beads for ready reuse in an extrusion process.

Another object of the present invention is to provide a plastic trim reclaim process that can be readily positioned in-line with a third-party extrusion process that develops wasted trim, wherein the trim is fed directly into an input hopper for processing into either brick or pellet form for reuse or resale.

Yet another object of the present invention is to provide a plastic trim reclaim process that is robust and requires minimal user oversight during operation.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 6 shows an exterior perspective view of the present plastic trim reclaim device.

DETAILED DESCRIPTION OF THE INVENTION

Figure 1:
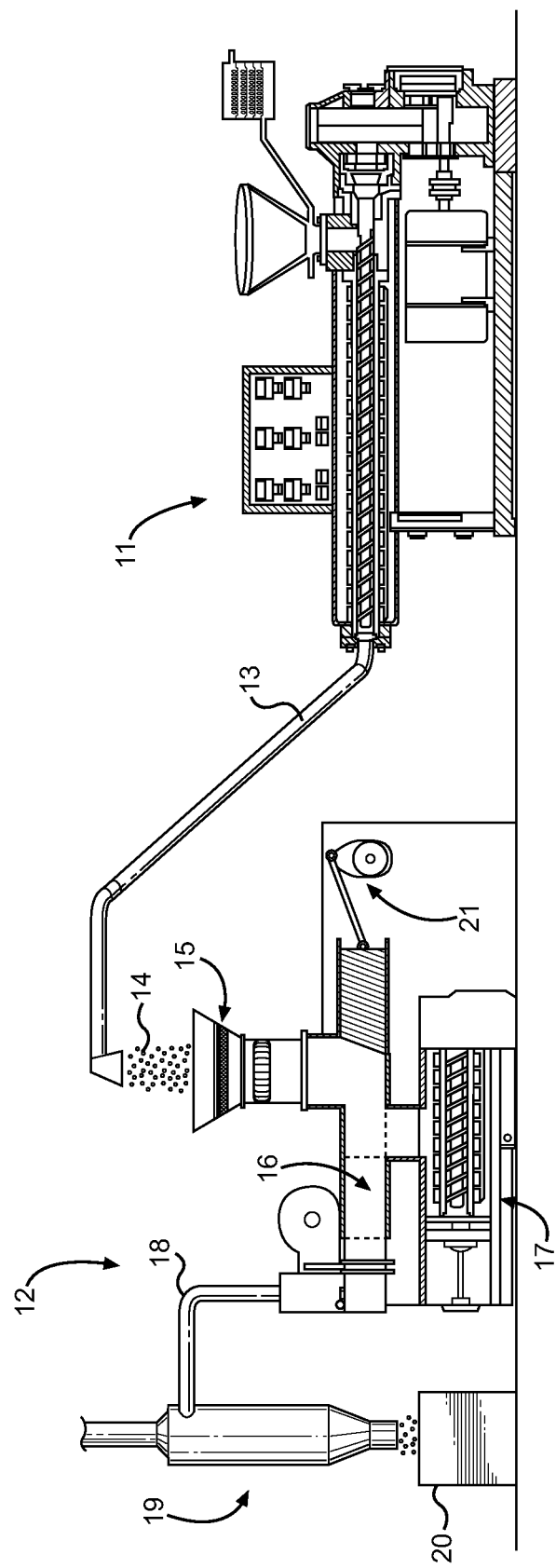
FIG. 1 shows a global view of the plastic reclaim process in-line with an existing extrusion process.

Reference is made herein to the attached drawings. Like reference numerals are used throughout the drawings to depict like or similar elements of the plastic trim reclaim process. For the purposes of presenting a brief and clear description of the present invention, the preferred embodiment will be discussed as used for recycling otherwise wasted plastic trim from an existing extrusion process. The figures are intended for representative purposes only and should not be considered to be limiting in any respect.

Referring now to FIG. 1, there is shown a schematic view of plastic trim reclaim device 12 of the present invention being utilized in-line with a thermoplastic extrusion process 11. During extrusion processes, particularly blown film or co-extrusion processes, finalized parts are trimmed to appropriate sizing using a cutting implement, wherein the final shape is derived and scrap trim is discarded. In in-line form, the scrap 14 from this process 11 can be fed through a feed line 13 and into the inlet section 15 of the reclaim device 12. The inlet 15 comprises a hopper that accepts gravity fed scrap material and funnels it into a grinding section wherein the scrap material is ground into smaller portions before being fed into the next stations of the device. After the inlet section, a driven ram 21 is utilized to force the ground scrap into one of two sections: a bricker section 16 or an extruder/pelletizer section 17. In the bricker section 16, the ground scrap undergoes a heating process as it is condensed into a formed, composite brick shape. The brick is then cut using a pneumatic or mechanically driven cutting tool, which controls the length of each brick section before being exited from the device 12 for handling. In the pelletizer section 17, the ground scrap plastic is heated, forced through a plurality of orifices before being cut and cooled into pellet form, whereafter the pellets are exhausted from the extruder via a forced air standpipe 18 and into an upstanding separator 19. The separator 19 vents the forced air and gravity feeds the pellets into a container 20. The pellets can then be utilized directly in the feed section of the extrusion process for reuse in the thermoplastic forming of a new product. Both the brick form and the pelletized forms have applications that allow reuse, resale and recovery of material that reduces wasted byproducts.

Within the input and feed section, thermoplastic trim is fed from a funnel to a grinding wheel using a centrifugal load sensitive plurality of driven nips (which can also be adjustable) into a cage-grinding wheel that can grind the trim into smaller portions. The ground trim, when at an appropriate size, is pushed through a breaker plate having a plurality of apertures, which prevent larger pieces from getting through. Pieces then can drop through the breaker plate into the compaction cylinder for further processing and heating into its one of two final forms. This input section assembly comprises of a DC variable RPM electric motor, which drives a cylindrical wheel against a rubber coated idler. The contact pressure is variable against the driven wheel for consistent intake of various types of plastic trim, wherein the draw motor is controlled by a single adjustable pot controller. Gain may be added into driveline of the assembly by increasing the pot setting. This allows control of the draw motor for larger or smaller sized scrap material, where no extra gain is required on smaller strips of incoming trim, the highest gain setting is utilized for heavier gauge and bulkier trims or with high levels of "slip" additive compositions.

Figure 2:
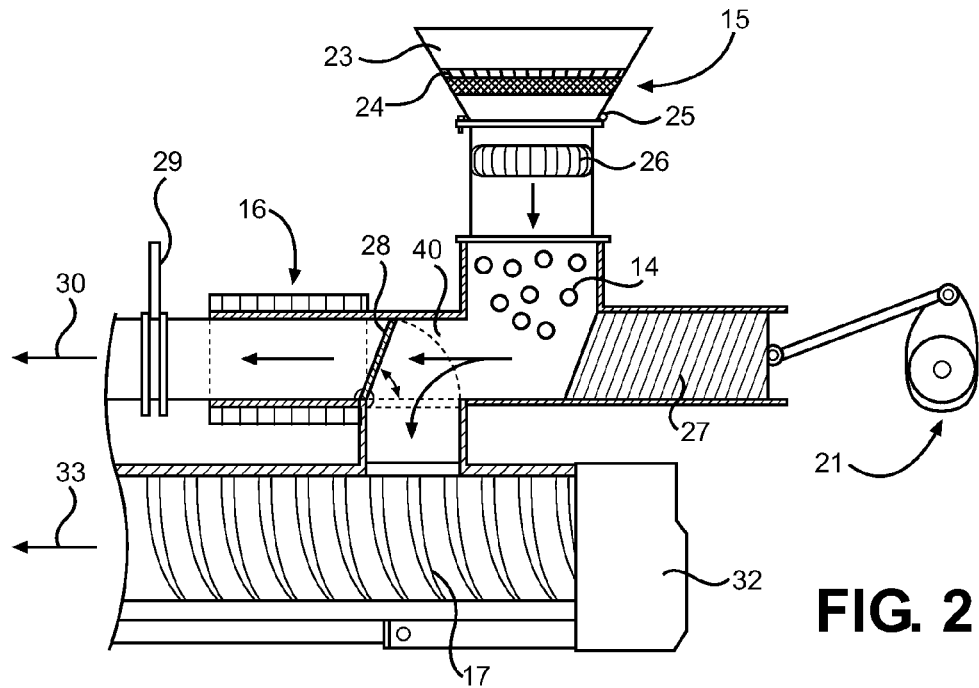
FIG. 2 shows the input and feed section and optional paths for which the trim to take within the device for the separate outputs.

Referring to FIG. 2, there is shown a close-up view of the input section 15 and the grinding section of the present trim reclaim device. The input section comprises funnel that feeds scrap material 14 into a grinding drum 26 using a rubber nip 24 that presses the unprocessed trim against a nerded draw roll that is fixed using a plurality of bearings. The nip 24 compresses the scrap trim against the nerded roll, whereafter the grinding drum reduces the trim size to a consistent dimension for heating and compacting. The funnel housing 15 is hingeable 25 to allow the assembly to be removed for inspection and cleaning. After leaving the nip and draw assembly within the funnel, the fed strips of plastic trim are processed into by a grinding wheel 26 that encompasses a plurality of deep tapered teeth. An adjustable breaker plate under grinding wheel restricts large pieces of trim from being prematurely processed before it has been reduced to crumbles of trim referred to as "Grind." When grind is small enough it will make its way through breaker plate and into the compaction section via vacuum from within the barrel and screw feed section 17 that is below compaction section and also the force from continuous intake of trim that is forced down by rotation of the grinding wheel.

Within the compaction chamber is a driven compaction ram 27 that is driven by a reciprocating armature and rotating drive motor 21. The grind 14 enters the chamber, which is divided by a rotating gate 28 that controls the flow of grind as the ram 27 forces its contents through the chamber. The gate 28 determines if the grind is to be processed into brick form via the bricker 16 (compaction and densifying section), or alternatively if the grind is to be processed into pellet-sized form for reuse (repelletizing and recovery section). As the ram 27 advances, the grind is condensed within the chamber. The chamber itself is surrounded by chilled jackets to prevent any pre-melting of the grind before entering the pelletizer extruder. If the gate for the bricker is open, the grind is forced through a heating chamber within the bricker 16, which melts the trim into a composite structure having the form of the chamber as it is being compressed by the ram 27. As it exits 30 the heating chamber, a pneumatic cutter sizes the brick lengths, whereafter the plastic bricks are forced through a plurality of resistive flaps to maintain ram pressure throughout the length of the chamber. The sized bricks then exit 30 the reclaim device and are ready for use after cooling.

If the path to the bricker 16 is closed by the gate 28, the grind is fed into an extruder 17 for repelletizing the scrap into resin sized beads. There is no thermal melt before the extruder as it is forced into the extruder by the ram 27. The grind is fed into the throat of the barrel and screw of the extruder 17 from the ram 27 pressure, wherein the extruder screw is driven by a motor and gearbox assembly 32 that turns the screw as the grind is heated. The screw advances the melted grind through a breaker plate whereafter it is cut by an inline cutter as it exits 33 the extruder barrel. This produces pellet sized beads that fall onto a chilled collection box to solidify. Once in the collection box, the pellets are conveyed via suction that is created by a forced air system of chilled air, further condensing the pellets and dispensing them into an upstanding standpipe before being separated and placed into a collection bin.

Figure 3:
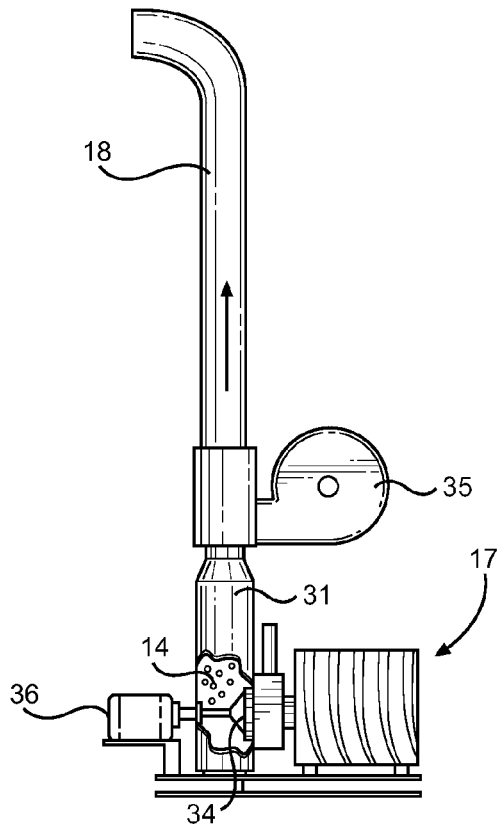
FIG. 3 shows a side view of the output of the pelletizer, wherein the pellets are condensed and vacuumed through an outlet standpipe and separator and into a container.

Referring now to FIG. 3, there is shown a side view of the pelletizer exit as the melted grind is forced from the extruder 17 screw and through a breaker plate 34, which comprises a plurality of apertures for which the grind to extrude therethrough. As the grind is extruded through the plate, an inline cutter sizes the extrusion into small pellets, which fall into a chilled collection box. The cutter is rotated by an electric motor 36, while chilled air is forced through the collection box by a pusher bow, which draws in chilled air and creates a vacuum in which the pellets 14 are lifted through an upstanding standpipe 18 for later separation.

Figure 4:
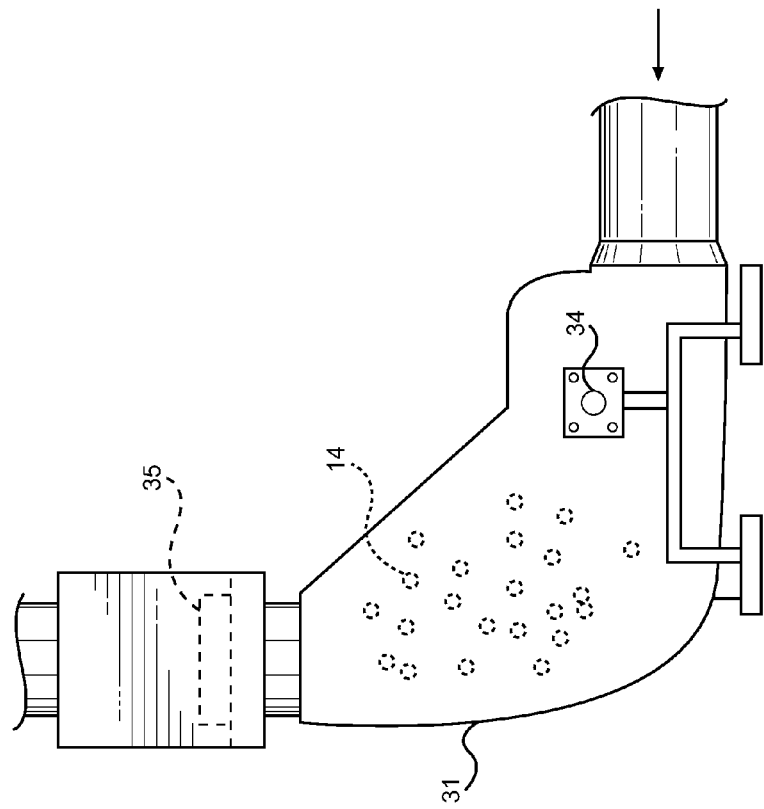
FIG. 4 shows an end view of the pelletizer, wherein formed pellets are condensed using a chilled, forced air system, whereafter the pellets are sent through the outlet standpipe.

Referring now to FIG. 4, there is shown an end view of the pelletizer exit and collection chamber 31 as the pellets are suctioned into the standpipe. Chilled forced air enters the chamber 31 via an intake, which is drawn into the box by a pusher blower 35 above the chamber. The chilled air condenses the pellets 14 as well as suctions them into the standpipe for collection. The pellets enter the chamber 31 through the breaker plate 34 and inline cutter, falling into the chamber and condensing.

Figure 5:
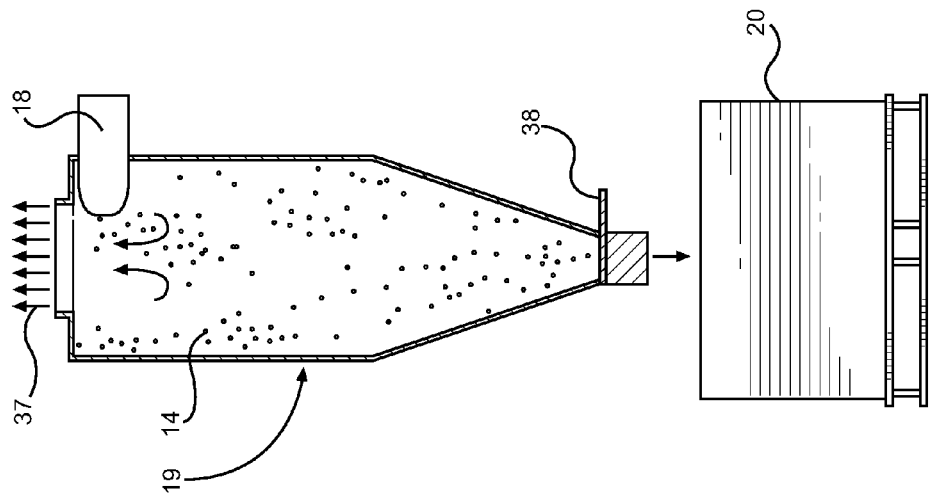
FIG. 5 shows a side view of the separator, which separates the forced air from the pellets before the pellets are gravity fed into a container.

Referring now to FIG. 5, there is shown the final stage of the pelletizer section, which is a recovery section comprising a separator 19 that allows the pellets to enter through the top of the device via the stand pip 18 and fall to a funnel section at its lower. The forced air exhausts 37 from the top of the separator as the pellets 14 fall. A slide gate 38 at the base of the separator allows a controller to release the collected pellets 14 into a collection bin 20 or Gaylord. The pellets are then ready to be used directly in a thermoplastic extrusion process, whereby the pellets are reheated and used to form new products.

Referring now to FIG. 6, there is shown an exterior overhead perspective view of the present plastic trim reclaim device. From this view, the input and feed section 15 is shown, wherein trim scrap may enter the device. External user control determines which process the trim will undergo: either bricking or pelletizing. The sized bricks 14 exit the device for user handling or further conveying, while the pellets exit a standpipe 18 and enter a separator 19, allowing forced air 37 to exit and the pellets to collect into a collection bin. The input section 15, grinding section and the recovery section 19 are externally visualized, while the compaction or pelletizing section is within the main cavity of the structure.

Overall, the process combines two operations, a bricker and a repelletizer, for the purposes of reclaiming trim scrap from a thermoplastic manufacturing process. The bricks are useful to an owner for resale or for use as a packaging material or structural slat material, while the pellets can be reused in the original extrusion process. The pellets are virgin starting material for an extrusion process. Therefore, the present invention allows a user to decide which mode to run and choose the specific output, which may be reused, sold or utilized to form a new product.

In light of the present disclosure and the given prior art, it is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plastic reclaim device, comprising:
   an input feed section adapted to accept thermoplastic trim material;
   a pre-sizing and grinding section adapted to grind said trim material;
   a compaction chamber and a ram adapted to direct said trim material into either a bricker section or a pelletizer section;
   a rotating gate configured to control a flow of said trim material as the ram forces said trim material through the compaction chamber and said rotating gate is disposed within said compaction chamber capable of alternatively directing said trim material into said bricker section or into said pelletizer section;
   said bricker section adapted to create elongated lengths of solid plastic;
   said pelletizer section adapted to create pellets of plastic;
   said pelletizer section comprising an extruder adapted to shape said trim material into pellets, and a collection box adapted to condense said pellets, said collection box further comprising chilled, forced air to condense said pellets and convey said pellets through an upstanding standpipe;
   said standpipe connecting to a separator adapted to exhaust said forced air and collect said condensed pellets via gravity feed into an external bin.

2. The device of claim 1, wherein said bricker section comprising a heater and a cutter to melt said trim material as said ram is compressing said trim material into a formed section, wherein said formed section is cut by said cutter to a predetermined length before exiting said compaction chamber.

3. The device of claim 1, wherein said pelletizer section further comprises an extruding breaker plate and an inline cutter to cut said trim material into pellet form.

4. The device of claim 1, wherein
   said input feed section and said pre-sizing and grinding section further comprise a funnel for accepting gravity fed scrap material, a plurality of load sensitive driven nips, a cage-grinding wheel adapted to grind said trim, a breaker plate adapted to accept ground trim therethrough and into said compaction chamber when ground to a predetermined size.

5. The device of claim 1, wherein said ram is driven by an armature linkage and is connected to a rotating motor.

6. The device of claim 1, wherein said compaction chamber further comprises chilled jackets along its sidewalls to prevent melting of said ground trim within said chamber and before said pelletizer section.

7. The device of claim 1, wherein an outlet of said bricker comprises a plurality of resistive flaps to provide backpressure against a sized brick during exit from said bricker section, such that said trim material being heated and rammed remains compressed within said bricker.

* * * * *